United States Patent [19]

Sobczyk

[11] 3,920,930

[45] Nov. 18, 1975

[54] FIELD EFFECT RECORDINGS AND SEMICONDUCTOR PLAYBACK DEVICES

[76] Inventor: John James Sobczyk, 68 Fairview Plaza, Los Gatos, Calif. 95030

[22] Filed: Apr. 8, 1974

[21] Appl. No.: 458,706

[52] U.S. Cl................. 179/100.41 T; 179/100.1 B; 179/100.41 K

[51] Int. Cl.².......................................... H04R 23/00

[58] Field of Search.......... 179/100.41 K, 100.41 T, 179/100.1 B, 100.41 V, 110 B; 73/88.5 SD

[56] References Cited

UNITED STATES PATENTS

| | | | |
|---|---|---|---|
| 3,445,596 | 5/1969 | Drake et al. | 179/100.41 T |
| 3,609,252 | 9/1971 | Broce et al. | 179/100.41 K |

FOREIGN PATENTS OR APPLICATIONS

| | | | |
|---|---|---|---|
| 1,181,275 | 11/1964 | Germany | 179/100.1 B |

*Primary Examiner*—Bernard Konick
*Assistant Examiner*—Stewart Levy
*Attorney, Agent, or Firm*—John J. Leavitt

[57] ABSTRACT

A transducer apparatus wherein the source to drain current, or conductance, of an insulated gate semiconductor field effect device is modulated by the relative movement of the gate electrode or insulating layer so that such modulations conform to variations in electrical or physical characteristics of the gate electrode or insulating layer. Specific transducer modifications include several phonograph record and pickup systems. Pickups may include preamplifiers in either discrete or integrated circuit form.

18 Claims, 8 Drawing Figures

A-A

FIELD EFFECT RECORDINGS AND SEMICONDUCTOR PLAYBACK DEVICES

BACKGROUND OF THE INVENTION

This invention relates to recorded information or other functional variations in a metal and/or dielectric medium form functioning as the metal electrode and/or the dielectric insulating layer, respectively, of (and for each case herein separated from) an insulated gate semiconductor field effect device; the invention also relates to semiconductor field effect transducer devices for the playback of recorded information in such metal and/or dielectric medium forms. The invention particularly relates to the electric field-induced modulation of the carrier mobility, or of the current flow, of the channel layer of such semiconductor transducer devices by virtue of recorded variations in the physical or electrical characteristics of such dielectric and/or metal medium forms.

Conventional phonograph disc recording technology allows superior reproducing qualities with present-day materials and techniques. In fact, conventional recordings are most often limited in frequency response, etc., only by the playback system. Conventional phonograph recordings, however, are subject to wear, chemical deterioration due to physical handling, and various foreign particle entrapments in the "grooves."

It is intended by this invention to provide a phonograph disc or other recording form which is free of the wear and foreign particle entrapment exhibited by conventional recording forms such as discs and tapes which use mechanically displaced material, or "grooves" in the case of the phonograph disc, to record sound, encodings, etc. It is further intended by this invention to provide a semiconductor playback device which is used with this new recording form and which does not operate by duplicating or tracking such mechanical displacements in the manner of a typical phonograph stylus, but rather responds by varying only its active electrical characteristics according to encoded metal or dielectric modulations essentially at the surface of the recording form.

A further object of the invention is to provide a transducer apparatus wherein any such similar field effect semiconductor device is used in conjunction with an essentially detached metal or dielectric structure so that inflections of the device's electrical output signal represent information as to the state, position, size, movement, etc., of the aforementioned detached structure.

SUMMARY

The invention is a system which comprises a revolving phonograph record-shaped metal disc whereupon the metal has flat-surfaced embossments corresponding to the "grooves" of a conventional phonograph disc and whereupon a "stylus," composed of appropriately doped semiconductor materials with a metal oxide insulating layer and simultaneously employed as an active device, tracks or follows over the aforesaid embossments in the relative direction and path of a conventional stylus tracking the grooves of a conventional phonograph disc. Another form of the invention is another system which comprises a similarly shaped metal disc whereupon a dielectric material overlies in areas corresponding to the grooves of a conventional phonograph disc and whereupon a "stylus," composed of appropriately doped semiconductor materials with or without a metal oxide insulating layer, and employed as an active device, tracks or follows over the aforesaid dielectric in the relative direction and path of a conventional stylus tracking the grooves of a conventional phonograph disc. It is intended, however, that the invention itself is comprised of any metal and/or dielectric features or areas of the medium form or structure along with a semiconductor playback device in any such physical arrangement so that appropriate relative movement of such features or areas induces changes in the active (output) charateristics of the aforesaid playback (pickup) device in the manner disclosed by the invention.

Since the recorded forms of the systems mentioned above contain recorded information at the surface of the metal embossments or dielectric areas, the recording is relatively free of those particles which normally accumulate in the "grooves" of a standard recording, although various embodiments are possible according to the invention which do not necessarily exhibit this feature. Furthermore, it is intended that the aforesaid materials used in the recorded forms of the invention are more durable and wear-free than standard vinylite recordings.

This invention utilizes electric field undulations of the recorded form, or of the semiconductor device as induced by the recorded form, to change the active characteristics (current flow or transconductance) of a channel (conducting) layer, either induced or diffused, of the aforementioned semiconductor "stylus." It therefore should not be considered an extension of previous systems which utilize an encoded dielectric whose movement across a metal electrode head varies the capacitance resulting from the mutual contact of the dielectric and head (U.S. Pat. No. 3,378,645). Nor should it be considered an extension of a previous active semiconductor field effect device whose channel layer conductance is altered by mechanical stresses in the insulating layer induced by movements of a conventionally designed phonograph stylus (U.S. Pat. No. 3,609,252). Since the playback device (stylus) of this invention is fabricated of semiconductor materials, the device may be incorporated into integrated circuit technology. Further, it will be noted that the recorded form and the semiconductor playback device constitute integral parts of the transducer function of the system.

Additional embodiments of the invention comprise various styluses of doped semiconductor materials with or without insulating layers or electrodes, used to obtain certain information, not necessarily mechanically or electrically encoded, concerning appropriately positioned metal or dielectric structures which provide field effect modulation of such styluses. Such a structure need not be an integral component of the particular embodiment; the device may thereby consist solely of the semiconductor stylus used to detect quantities such as relative position, vibration patterns or dielectric strength of certain objects or materials which field effect modulate the channel layer of the stylus.

BRIEF DESCRIPTION OF THE DRAWING

As a partial description of the invention in its present embodiment, an explanation of the accompanying figures is offered as follows.

DESCRIPTION OF THE PREFERRED EMBODIMENTS

Figure 1:
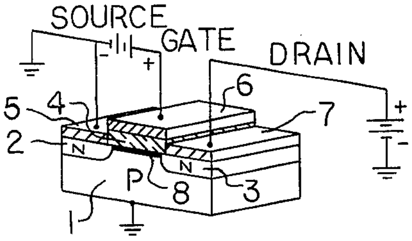
FIG. 1 is a cross-sectional view of an insulated gate semiconductor field effect device, shown with appropriate biasing.

The essentials of an insulated gate field effect transistor (IGFET), also known as a metal oxide semiconductor field effect transistor (MOSFET), are shown in FIG. 1. The device consists of a P-type semiconductor material substrate 1, such as silicon, upon which N-type drain and source areas 2 and 3 are diffused in close proximity to each other. Techniques such as photoresist masking allow diffusion in the proper areas. A thin insulating layer of a suitable dielectric 4, such as silicon dioxide $SiO_2$, is oxidized over the surface between source and drain, forming the gate dielectric material. Metal electrodes 5, 6, and 7, usually aluminum, cover source, gate, and drain areas respectively. With source terminal as reference and the gate as control terminal, the output of the device is from the drain. Another type of construction oxidizes $SiO_2$ over the entire surface, and holes are then etched through the oxidized material for deposit of aluminum contacts to source and drain. The P-type substrate isolates source and drain in what is known as the enhancement type device, wherein a positive gate potential between gate and source, as shown, attracts minority electron carriers from the substrate, forming (inducing) a conducting N-channel 8 between source and drain, after so-called "inversion," where hole concentration is reduced. With zero gate bias, however, no electron carriers are available for channel conduction between source and drain in this mode. This, then, is the N-channel, enhancement type IGFET. With an N-type substrate and P-type drain and source, a P-channel is induced with negative bias over the gate. The source, gate, and drain are analogous in operation to emitter, base, and collector, respectively, of a transistor. In either N-channel or P-channel devices, the substrate may be brought out to external connection to make a four-terminal device. In operation the IGFET exhibits current and power gain as the channel resistivity is controlled by the electric field through the insulator (dielectric).

Another type of IGFET is the depletion type. The source and drain are connected by a conducting channel, instead of isolated by the substrate, and with zero gate bias this type exhibits conduction. The conducting channel is diffused in the location of 8 in FIG. 1. In principle the depletion type device operates the same way as the enhancement type. Positive gate potentials are limited by a gate-to-source breakdown voltage. Since this type may also be constructed as a hole conduction (P-channel) device, there are actually four types of IGFET's—depletion or enhancement, each with two substrate types. The present invention is constructed as an N-channel, depletion type device. Any of the other three types are still within the scope of this invention. An IGFET depletion type, ie., with diffused conducting channel, can operate in depletion or enhancement modes depending on the bias values.

Figure 2:
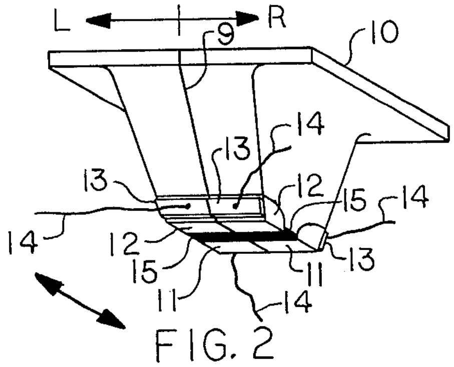
FIG. 2 is an underside view of the semiconductor field effect transducer playback device (stylus) for use with recorded dielectric medium forms in accordance with this invention, showing orientation of left and right tracks for stereophonic mode; also shown is the relative direction of tracking (in bold arrow) across the recording.
Figure 3:
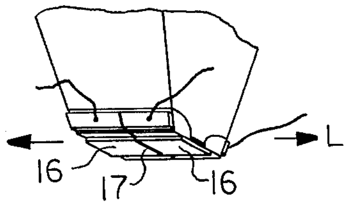
FIG. 3 is an underside view of a similar semiconductor field effect transducer playback device (stereo) with an insulating layer of suitable dielectric material located underneath for use with recorded metal or dielectic medium forms in accordance with this invention.

FIG. 2 shows two field effect devices separated by a thin, non-conducting material 9 for stereo mode to be used as a playback device for the present invention. P-type substrate 10, such as silicon, has N-type source 11 and drain 12 areas diffused, and these source and drain areas have electrodes 13 deposited on their side surfaces with lead wires 14 for each of the four electrodes. An N-channel 15 is diffused between source and drain for right R and left L stereo components. The device is constructed in the conventional manner of an MOSFET type device for right and left stereo components, as in FIG. 1, except that the gate insulating layer and gate electrode for each stereo component are deleted, and the semiconductor is formed to the appropriate shape for the present playback device, with enough source and drain areas remaining so that the complete channel layer 15 is exposed. Provisions for mounting in a typical tone arm are not shown. Although FIG. 2 implies that two such devices are to be constructed and combined for stereo mode, separated by material 9, this construction, although operational, is primarily experimental. As illustrated in FIG. 3, the practical construction of the device of FIG. 2 for stereo uses a single (silicon) P-type substrates upon which oppositely doped areas are diffused in the conventional manner. Subsequently, two "channels" are obtained for stereo mode by cutting (etching) a line through the diffused areas deep enough to separate these areas in the same location and direction as the non-conducting separating material 9, ie., through depth of channel and drain layers. This cut into the playing surface need not separate source areas; alternately, source contacts may be clipped together for purposes of a common bias. The separation of right and left channels for stereo will hereafter be referred to as "stereo separation line," and this phrase will refer to either kind of separation for stereo, ie., a cut in the bottom playing surface or a material separating the complete body into two halves. These are various other locations, geometries, or constructions for electrode attachment, but the effect of any arrangement, of course, is to supply diffused with proper input or output contacts. These contacts, however, should not extend to the plane of the playing surface (diffused areas 15 and adjacent areas 11 and 12) so as to protrude onto the surface of the recorded metal or dielectric form over which the playback device moves. Another construction of this device would have right and left stereo components facing outwards, allowing conductng channels to run parallel to the direction of relative movement, and to each other, and requiring either drain or source diffused areas to be located between right R and left L stereo components, separated by the same stereo separation line 9, with remaining source or drain diffused areas located at either side of the complete device rather than in front or in back. This latter device is expected to be inferior to the present arrangement due to difficulty in providing contacts. In either case the width of the playing surface is comparable to the width of a typical "groove" of a conventional stereo phonograph disc (a few mils). The overall dimensions are comparable to those of a standard phonograph "needle." The entire surface, except bottom playing surface and any electrode-semiconductor interface, may be oxidized with an insulator for protection (not shown). Also needed (not shown) is a contact for proper substrate biasing.

FIG. 3 shows a section of a stereo playback device similar to that of FIG. 2. It is constructed in an identical fashion except that an oxidized insulator (dielectric) area 16, $SiO_2$, runs across the playing surface of the device for both right R and left L stereo components and likewise separated by the stereo separation line 17. The undersurface of the dielectric is the playing surface of this device. The dielectric may be the same as that used to cover the entire device for protection, as suggested in the previous paragraph. Because source areas are common for this construction, only one source lead is shown. By constructing the devices of FIGS. 2 and 3 without provisions for two-channel stereo mode, ie., using single source, channel, and drain, a monoral device is obtained.

Figure 4:
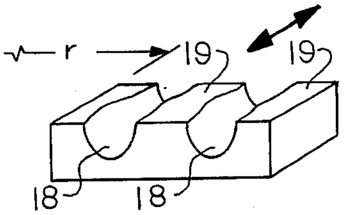
FIG. 4 is a cross-sectional view of a surface segment from a conventional phonograph record showing the grooves representing recorded information; also shown is the direction of movement (in bold arrow) of the segment during playback; also shown is the radial direction from the center of the record.

FIG. 4 represents a cross-section of the surface of a conventional phonograph disc, showing a two of the "grooves" 18 with recorded information corresponding to changes in the shape of the groove. The section is moving tangentially to the radius vector r (from the center of the disc) as the disc rotates. Only one playing side is shown.

Figure 5:
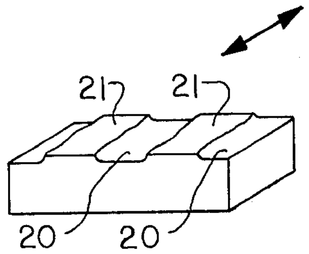
FIG. 5 is a corresponding cross-sectional view of a surface segment from the phonograph disc incorporating metal embossments for recorded information in accordance with this invention, to be used with device shown in FIG. 3.

One objective of the present invention is to provide a phonograph disc which is durable and relatively wear-free. FIG. 5 shows a section of the metal phonograph disc of this invention corresponding to the section of FIG. 4. It is constructed from a metal disc of overall dimensions identical to the conventional phonograph disc. However, the shallow grooves 20 of this disc correspond to the flat surfaces 19 of FIG. 4. The flat embossments 21 correspond to the width of grooves 18 of FIG. 4. The disc need not consist solely of metal. For one particular arrangement a polyester plastic resin is used to mold a disc to the form of FIG. 5 from a standard vinylite phonograph disc (as an impression) and then planed with abrasives. The new disc is then plated with a suitable conducting metal. However, various means of constructing the metal disc are possible. An appropriate matrix disc of the standard FIG. 4 shape can be plated; the plating becomes the form of FIG. 5, obtaining a form like that of an original matrix used in pressing standard vinylite discs. The surface is then planed with appropriate abrasives to flatten the embossments 21. Also, appropriate matrix discs may be used to deposit a suitable maskant on a blank metal disc in areas corresponding either to grooves or to areas between the grooves of the standard phonograph disc, or the maskant is removed in the same areas of a totally masked blank disc, and the disc is then chemically milled (etched) or electroplated, depending on which form of matrix disc is used. Current technology has allowed a precise, one-size photograph of a phonograph record in connection with optical playback systems, suggesting the use of photoresist maskants. The tolerances allowed by plating and chemical milling may be critical for true reproduction of sound recordings. The grooved areas 20 of FIG. 5 may be filled with a non-metal, non-dielectric material to provide a totally flat surface of the finished disc, helping increase wear resistance. These methods describe processes to construct the prototype unit of the invention, and they do not necessarily imply optimal methods with respect to frequency characteristics, quality, economy, strength, weight, etc. In any event, the resulting disc must carry a positive or negative charge to the metal embossments when some appropriate portion of the disc is biased, such as described later. The scope of the invention is not limited to the geometries or encoding function of conventional recordings described. This disc is used with the semiconductor playback device of FIG. 3 having a dielectric undersurface across the channel layer. A potential applied to the embossed metal disc, as described below, sets up an electric field in the insulating (dielectric) layer of the playback device as it tracks the embossments, modifying the channel current flow of the playback device.

Figure 6:
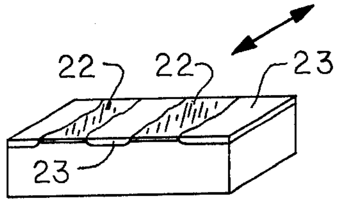
FIG. 6 is a corresponding cross-sectional view of a surface segment from the metal phonograph disc incorporating a dielectric for recorded information at the surface in accordance with the present invention, to be used with device shown in FIG. 2 or FIG. 3.

FIG. 6 shows a section of the metal phonograph disc incorporating a dielectric for recorded information at the surface. It is constructed in the same fashion as the disc in FIG. 5 except that a suitable dielectric material 22 such as alumina, $Al_2O_3$, is deposited on the face surfaces of the embossments corresponding to 21 of FIG. 5. Again, various means of construction are possible in addition to those mentioned in describing FIG. 5. A blank metal disc with a dielectric deposited on its entire surface can be used with appropriate masking and etching techniques. Again, the scope of the invention is not limited to the particular process used in arriving at this type of disc. It may be possible to deposit a flat metal disc with an insulating ink in the areas representing encoded information, although durability would perhaps be sacrificed in this construction. Another construction may employ a metal disc of the standard FIG. 4 form, the grooves of which are filled with a dielectric, although this suggests problems with the thickness of the dielectric and with the exposed metal portions 19. A non-metal, non-dielectric material 23 (optional) is also shown deposited in the spaces between areas 22 to provide a flat surface. This may be done before or after deposition of the dielectric. The thickness of the dielectric depends on the particular dielectric used, the operating voltages to be used with the system, etc. This disc may be used with the semiconductor playback device of FIG. 2 or of FIG. 3, although there is some question as to having two different dielectric layers 22 and 16 between the metal of the disc and the source and drain areas of the playback device as it tracks over this disc. In operation, an electric potential applied to a suitable metal portion of the disc, as described below, sets up an electric field in the dielectric which modifies the channel current flow in the semiconductor playback device as it is tracking over the encoded dielectric. If used with playback device of FIG. 3, the field must penetrate both dielectrics—that of the disc and of the playback device.

Figure 7:
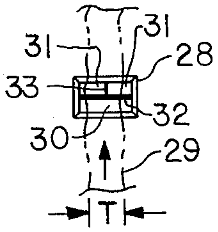
FIG. 7 is an operating arrangement and circuit schematic for the playback of recorded information in accordance with the present invention. Section A—A is taken at the disc-stylus interface and shows the underside of a playback device of the present invention, without insulating layer and without circuit elements of main figure, along with the outline or contour (in phantom) of a disc "track" over which the playback device is positioned.
Figure 7:
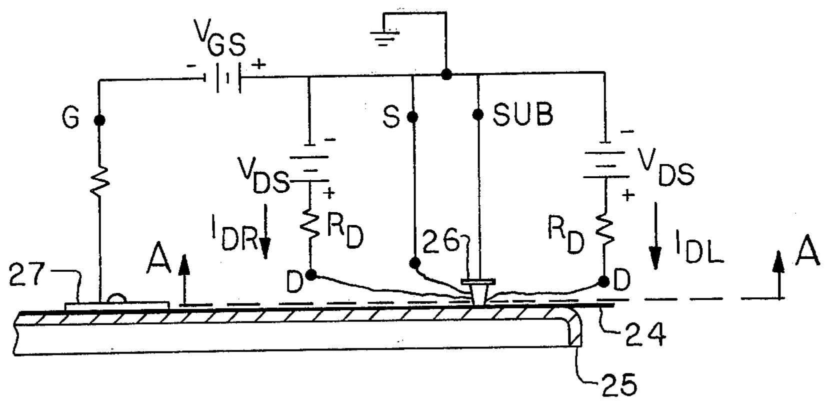

FIG. 7 shows the operating arrangement and electrical schematic of the system. Any of the phonograph discs 24 of the invention is shown resting on a cross-section of a phonograph turntable 25. The appropriate playback device 26 (assume N-channel) described above is shown oversize in its proper position on the disc for playback. Also shown are leads to drain D for each stereo component, to source S (commoned), and to substrate SUB of the playback device. Not shown is a tone arm to encase and guide the playback device. A biasing plate 27 is used for the gate G contact for applying the "gate" potential to the disc. Other methods of disc biasing, of course, are possible, such as through electrodes in the playback device itself. $V_{GS}$ is the gate-to-source voltage, shown here for depletion mode operation. $V_{DS}$ is the drain-to-source potential for each stereo component; $R_D$ is a load resistance for each drain. The substrate (in this case P-type) is ground-connected with appropriate ends of source, gate, and drain. The circuit elements above the turntable are shown for illustrative purposes. These elements are in actuality isolated from the playing surfaces, and the biasing plate is more conveniently placed beneath the record, or other biasing arrangements used. Also, these elements may be incorporated in integrated circuit form. $I_{DR}$ and $I_{DL}$ are output drain currents for each channel of the stereo mode. Typical values for a particular operating point depend on a variety of factors such as channel type, mode (enhancement, depletion), geometry, doping, desired output characteristics, etc. Here, $V_{GS} = -1.5$ volts; $V_{DS} = 10$v; $R_D = 0.5$ kohms; $I_D = 4$mA (depletion mode). A 5 kohm resistor is placed just below point G. Although operational, the circuit arrangement is not necessarily optimal and does not necessarily imply compatibility with typical commercial amplifiers. With the system arranged as suggested in FIG. 7, the playing surfaces of disc and semiconductor stylus are now analogous to the gate element and channel layer interface of an IGFET, presenting the channel layer of the semiconductor playback device with the voltage $V_{GS}$ described above (ideally). The maximum transconductance $G_O$ describes the proportion $\Delta I_D/\Delta V_{GS}$ when $V_{GS} = O$ and when $V_{DS}$ is greater than a characteristic pinchoff voltage $V_P$. For other $V_{GS}$ values, the transconductance $g_m = G_O(1 - V_{GS}/V_P)$.

Shown above the playback device 26 in section A—A is an enlarged bottom view of the same device 28, shown without insulating layer or electrodes, showing the contour 29 of the recorded form "track" (metal or dielectric) as it crosses the playing surface of the device in the direction suggested by the arrow. Source 30, drains 31, and channel 32 areas are also shown, as well as the stereo separation line 33. Assume that the current density through the channel layer, from source to drain, depends on the excess carrier (here, electron) concentration, which, of course, depends on channel forward bias and/or the field set up through the insulating (dielectric) material, either on the disc or on the playback device if FIG. 3 type is used. It is apparent that the current through the channel layer depends on the effective depth of the excess carriers and on the particular length T of the channel layer subtending the underlying electric field of the gate, ie., surface of the recorded form. The current is equal to the current density times the area perpindicular to the current forward vector in the channel layer (source-to-drain); this area now is the aforementioned channel layer depth (constant with constant field strength) times the length T. Therefore, the channel current variations with constant gate potential depend on the variations of the length of the controlling field, which are the same as the variations of the width = T of the moving "track" 29. These variations may occur either when the recorded metal from carries the field through a deposited dielectric 22 (FIG. 6) or when the insulating (dielectric) layer 16 of the playback device (FIG. 3) contacts the varying form of the metal plateaus 21 (FIG. 5) acting as gate electrode, ie., vis-a-vis the two systems of this invention. In the latter case the field in the device insulating layer 16 is as wide in each instant as the metal form "track" 21 over which it travels. In any case the output of the current through the drain varies with the recorded track; and the voltage over $R_D$ may be amplified. When further assumed that the stereo separation line 33 of the playback device continually tracks immediately over the center of the recorded form track 21 or 22 (or 29 of FIG. 7), the variations in track width on either side of the stereo separation line 33 produce corresponding changes in the current through the portion of channel layer over which these variations occur (right or left stereo channels), effectively resulting in stereophonic operation. In fact, tracking is accomplished by any one of a variety of methods. Tracking hairs on either side of the playback device may follow the "grooves" on either side of the particular recorded form track 21 or 22, assuming these grooves are not filled with other material such as 23, as previously suggested. Also under consideration for tracking is the attraction force resulting from adjacent charge densities at the disc-stylus interface. Magnetic methods are also feasible. It should be understood that the invention is not to be limited by the particular methods employed for tracking purposes.

It should be mentioned that although the operation of both systems embodied in this invention utilizes the varying geometry of the controlling electric fields, the invention does not preclude arrangements whereby the strength of the field itself, ie., through the aforementioned dielectrics, is varied by means such as undulating thicknesses of the dielectric recorded mediums, as intended for use with the playback devices described herein. For example, a dielectric may be deposited on the recorded tracks of a metal "Hill-and-Dale" disc on which sound is encoded by up and down variations of the cutting stylus rather than by lateral variations. The dielectric deposition would then vary in thickness corresponding to the Hill-and-Dale grooves, assuming the dielectric surfaces are flat. With constant gate (i.e., disc) potential, the consequent field variations would cause corresponding variations in the channel conductance and current flow of the playback device as it tracks the record.

Throughout the above discussion the phrase "metal and/or dielectric" was used to describe systems incorporating a metal medium or a metal along with a dielectric. The invention also lends itself, of course, to recorded forms using only a dielectric medium in the same operational context. Application of a biasing potential to such a recorded form could be accomplished by use of (gate) electrodes on the playback device itself, contacting the recorded dielectric track (embossments) at each side of the track or at other appropriate locations.

Other embodiments include a seismograph comprising a dielectric member having a linear, oscillatory response to movements of the earth while field effect modulating a stationary semiconductor device in a manner described in the invention. Another embodiment is a shaft speed sensor comprising a semiconductor device of the present invention whose channel layer is field effect modulated by the rotation of a dielectric element rigidly connected to the shaft, producing a pulse response in the output of the device.

Having thus described the invention, what I believe to be new and novel and desire to cover by letters patent of the United States is as follows:

1. A semiconductor field effect transducer device comprising in combination:

a. a stylus of doped semiconductor material of one conductivity type having doped source and drain areas of opposite conductivity type separated by and connected to a conducting channel; and source and drain electrodes connected to said doped source and drain areas;

b. a power source connected to said source electrode for selectively causing a preselected current flow through said conducting channel;

c. an insulating layer constituting a gate electrode lying adjacent to said source, drain, and channel areas;

d. means for connecting a power source to said source electrode and said gate electrode; and e. an output circuit connected to said drain electrode;

f. selected portions of said source, drain, and conducting channel areas arranged so that current flow through a portion of said conducting channel area is field effect modulated by variations in electric fields induced in said gate electrode by virtue of the transverse movement of said gate electrode relative to said semiconductor stylus.

2. A semiconductor field effect transducer device comprising in combination:

a. a stylus of doped semiconductor material of one conductivity type having doped source and drain areas of opposite conductivity type separated by and connected to a conducting channel; and source and drain electrodes connected to said doped source and drain areas;

b. a power source connected to said source electrode for selectively causing a preselected current flow through said conducting channel;

c. an insulating layer contiguous with and overlying portions of said source, drain, and channel areas and constituting a gate;

d. a metal gate electrode structure lying adjacent to said source, drain, and channel areas;

e. means for connecting a power source to said source electrode and said gate electrode structure; and f. an output circuit connected to said drain electrode;

g. selected portions of said source, drain, and conducting channel areas arranged so that current flow through a portion of said conducting channel area is field effect modulated by variations in electric fields induced in said gate insulating layer by virtue of the transverse movement of said gate electrode structure relative to said semiconductor stylus.

3. A semiconductor field effect transducer device comprising in combination:

a. a stylus of doped semiconductor material of one conductivity type having doped source and drain areas of opposite conductivity type separated by and connected to a conducting channel; and source and drain electrodes connected to said doped source and drain areas;

b. a power source connected to said source electrode for selectively causing a preselected current flow through said conducting channel;

c. an output circuit connected to said drain electrode;

d. selected portions of said source, drain, and conducting channel areas arranged so that current flow through a portion of said conducting channel area is field effect modulated by variations in electric fields which occur in proximity of said conducting channel area by virtue of the relative movement, composition, position, physical characteristics, or other property of any structure carrying said electric fields when said structure is in an appropriate position or orientation relative to said transducer device.

4. A semiconductor field effect transducer device comprising in combination:

a. a stylus of doped semiconductor material of one conductivity type having doped source and drain areas of opposite conductivity type separated by and connected to a conducting channel; and source and drain electrodes connected to said doped source and drain areas;

b. a power source connected to said source electrode for selectively causing a preselected current flow through said conducting channel;

c. an insulating layer constituting a gate electrode lying adjacent to said source, drain, and channel areas;

d. a conductive layer contiguous with and overlying said gate insulating layer;

e. means for connecting a power source to said source electrode and said gate electrode; and f. an output circuit connected to said drain electrode;

g. selected portions of said source, drain, and conducting channel areas arranged so that current flow through a portion of said conducting channel area is field effect modulated by variations in electric fields of said insulating layer caused by variations in electric fields which occur in proximity of said device by viture of the relative movement, composition, position, physical characteristics, or other property of any structure carrying said electric fields when said structure is in an appropriate position or orientation relative to said transducer device.

5. A transducer apparatus for reproduction of information forms, said apparatus comprising in combination:

a. a recorded medium, said medium comprising an electrically conducting substance, portions of said conducting substance varying in width, thickness, or other property as a function of the information form;

b. a semiconductor field effect playback device for reproducing recorded information in metal medium form, said playback device comprising 1. a stylus of doped semiconductor material of one conductivity type having doped source and drain areas of opposite conductivity type separated by and connected to a conducting channel; and source and drain electrodes connected to said doped source and drain areas;

2. a power source connected to said source electrode for selectively causing a preselected current flow through said conducting channel;

3. a gate insulating layer contiguous with and overlying portions of said source, drain, and conducting channel areas;

4. means for connecting a power source to said recorded medium;

5. an output circuit connected to said drain electrode;

6. selected portions of said source, drain, and conducting channel areas arranged so that current flow through a portion of said conducting channel area is field effect modulated by variations in electric fields of said insulating layer caused by said metal recorded form serving as gate electrode resulting from movement of said recorded form relative to said playback device.

6. The transducer apparatus of claim 5 wherein said recorded medium is a phonograph record comprised of electrically conductive substance, portions of the electrically conductive substance varying geometrically to produce the equivalent effect of the track or groove representing recorded waveforms of a conventional phonograph disc.

7. A transducer apparatus for reproduction of information forms, said apparatus comprising in combination;

a. a medium on which information is recorded and including a carrier of electrically conducting substance, and a deposition of a dielectric material thereon, portions of said dielectric material and or of said carrier varying in width, thickness, or other property as a function of the recorded information form;

b. a semiconductor field effect playback device for reproducing information recorded in said dielectric medium form, said playback device comprising 1. a stylus of doped semiconductor material of one conductivity type having doped source and drain areas of opposite conductivity type separated by and connected to a conducting channel; and source and drain electrodes connected to said doped source and drain areas;

2. a power source connected to said source electrode for selectively causing a preselected current flow through said conducting channel;

3. means connecting a power source to said recorded form;

4. an output circuit connected to said drain electrode;

5. selected portions of said source, drain, and conducting channel areas arranged so that current flow through a portion of said conducting channel area is field effect modulated by variations in electric fields of said recorded form, serving as gate elements, by virtue of the movement of said recorded form relative to said field effect playback device.

8. The transducer apparatus of claim 7 wherein said recorded dielectric medium is a phonograph record including said carrier and said depostion of dielectric material, selected portions of the dielectric material or carrier varying geometrically to produce the equivalent effect of the track or groove representing the recorded waveforms of a conventional phonograph disc.

9. The transducer apparatus of claim 7 wherein said medium on which information is recorded comprises only dielectric material without said electrically conducting substance; and wherein said means for connecting a power source to said recorded medium constitutes an electrode for causing electric fields in said dielectric material, said medium serving as a gate insulating element to field effect modulate the current flow through said conducting channel layer resulting from movement of said medium relative to said playback device.

10. The transducer apparatus of claim 9 wherein said recorded dielectric medium is a phonograph record comprised of dielectric material, portions of the dielectric material varying geometrically to produce the equivalent effect of the track or groove representing the recorded waveforms of a conventional phonograph disc.

11. The transducer apparatus of claim 7 wherein said playback device has an insulating layer contiguous with and overlying portions of said source, drain, and conducting channel areas so that current flow through a portion of said conducting channel area is field effect modulated by variations in electric fields induced in said insulating layer by variations in electric fields of said recorded form resulting from movement of said recorded form relative to said playback device.

12. The transducer apparatus of claim 11 wherein said recorded dielectric medium is a phonograph record including said carrier and said deposition of dielectric material, selected portions of the dielectric material or carrier varying geometrically to produce the equivalent effect of the track or groove representing the recorded waveforms of a conventional phonograph disc.

13. The transducer apparatus of claim 11 wherein said recorded medium comprises only dielectric material without said electrically conducting substance, and wherein said means for connecting a power source to said recorded medium constitutes an electrode for causing electric fields in said recorded medium and in said insulating layer of said playback device, said recorded medium serving to field effect modulate the current flow through said conducting channel layer resulting from movement of said recorded medium relative to said playback device.

14. The transducer apparatus of claim 13 wherein said recorded dielectric medium is a phonograph record comprised of dielectric material, portions of the dielectric material varying geometrically to produce the equivalent effect of the track or groove representing the recorded waveforms of a conventional phonograph disc.

15. The transducer apparatus of claim 7 wherein said playback device has an insulating layer contiguous with and overlying portions of said source, drain, and conducting channel areas, and a conductive layer contiguous with and overlying said insulating layer so that current flow through a portion of said conducting channel area is field effect modulated by variations in electric fields induced in said insulating layer by variations in electric fields of said recorded medium resulting from movement of said recorded form relative to said playback device.

16. The transducer apparatus of claim 15 wherein said recorded dielectric medium is a phonograph record including said carrier and said deposition of dielectric material, selected portions of the dielectric material or carrier varying geometrically to produce the equivalent effect of the track or groove representing the recorded waveforms of a conventional phonograph disc.

17. The transducer apparatus of claim 15 wherein said recorded medium comprises said dielectric material without said electrically conducting substance, and wherein said means for connecting a power source to said recorded medium constitutes an electrode for causing electric fields in said recorded medium and in said insulating layer of said playback device, said recorded medium serving to field effect modulate the current flow through said conducting channel layer resulting from movement of said recorded medium relative to said playback device.

18. The transducer apparatus of claim 17 wherein said recorded dielectric medium is a phonograph record comprised of dielectric material, portions of the dielectric material varying geometrically to produce the equivalent effect of the track or groove representing the recorded waveforms of a conventional phonograph disc.

* * * * *